US012744001B2

(12) United States Patent
Shin et al.

(10) Patent No.: US 12,744,001 B2
(45) Date of Patent: Sep. 22, 2026

(54) DATA DRIVER FOR DISPLAY AND SENSING CIRCUIT THEREOF

(71) Applicant: LX SEMICON CO., LTD., Daejeon (KR)

(72) Inventors: Young Ho Shin, Daejeon (KR); Won Kim, Daejeon (KR); Seong Geon Kim, Daejeon (KR); Taiming Piao, Daejeon (KR); Byeon Cheol Lee, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 18/721,366

(22) PCT Filed: Nov. 18, 2022

(86) PCT No.: PCT/KR2022/018317
§ 371 (c)(1),
(2) Date: Jun. 18, 2024

(87) PCT Pub. No.: WO2023/120999
PCT Pub. Date: Jun. 29, 2023

(65) Prior Publication Data

US 2025/0061854 A1 Feb. 20, 2025

(30) Foreign Application Priority Data

Dec. 21, 2021 (KR) ........................ 10-2021-0183645

(51) Int. Cl.
*G09G 3/3233* (2016.01)
*G09G 3/3275* (2016.01)

(52) U.S. Cl.
CPC ......... *G09G 3/3233* (2013.01); *G09G 3/3275* (2013.01); *G09G 2300/0852* (2013.01);
(Continued)

(58) Field of Classification Search
CPC .................................................... G09G 3/3233
(Continued)

(56) References Cited

U.S. PATENT DOCUMENTS

2015/0091618 A1* 4/2015 Min .................... G11C 27/026
327/93
2015/0091888 A1* 4/2015 Min .................... G09G 3/3291
345/212
(Continued)

FOREIGN PATENT DOCUMENTS

KR 10-2015-0037118 A 4/2015
KR 10-2018-0078700 A 7/2018
(Continued)

OTHER PUBLICATIONS

Search Report issued for International Application No. PCT/KR2022/018317 on Feb. 28, 2023, 4 pages.
(Continued)

*Primary Examiner* — Long D Pham
(74) *Attorney, Agent, or Firm* — ROTHWELL, FIGG, ERNST & MANBECK, P.C.

(57) ABSTRACT

An embodiment provides a data driver for a display and a sensing circuit thereof, and the sensing circuit comprises: an analog front end circuit which generates an input voltage; a sample-and-hold circuit which stores a first sampling voltage according to the input voltage and generates a second sampling voltage obtained by converting the first sampling voltage; and an amplifier circuit which generates a sensing voltage according to the second sampling voltage.

15 Claims, 12 Drawing Sheets

(52) U.S. Cl.
CPC ............... *G09G 2310/0294* (2013.01); *G09G 2320/0295* (2013.01)

(58) Field of Classification Search
USPC ............................................................ 345/76
See application file for complete search history.

(56) References Cited

U.S. PATENT DOCUMENTS

| | | | | |
|---|---|---|---|---|
| 2016/0078805 | A1 | 3/2016 | Woo et al. | |
| 2018/0114815 | A1 | 4/2018 | Lee et al. | |
| 2018/0190207 | A1 | 7/2018 | Hwang | |
| 2020/0234636 | A1* | 7/2020 | Lin | G11C 27/026 |
| 2021/0043148 | A1 | 2/2021 | Lee et al. | |
| 2021/0158738 | A1 | 5/2021 | Kim et al. | |
| 2021/0193056 | A1* | 6/2021 | Piao | G09G 3/3291 |
| 2021/0295775 | A1* | 9/2021 | Lin | G09G 3/3258 |

FOREIGN PATENT DOCUMENTS

| | | | |
|---|---|---|---|
| KR | 10-2021-0016680 | A | 2/2021 |
| KR | 10-2021-0079025 | A | 6/2021 |

OTHER PUBLICATIONS

Extended European Search Report dated Jul. 30, 2025, issued for the corresponding European patent application No. 22911636.3, 13 pages.

* cited by examiner

[FIG. 1]
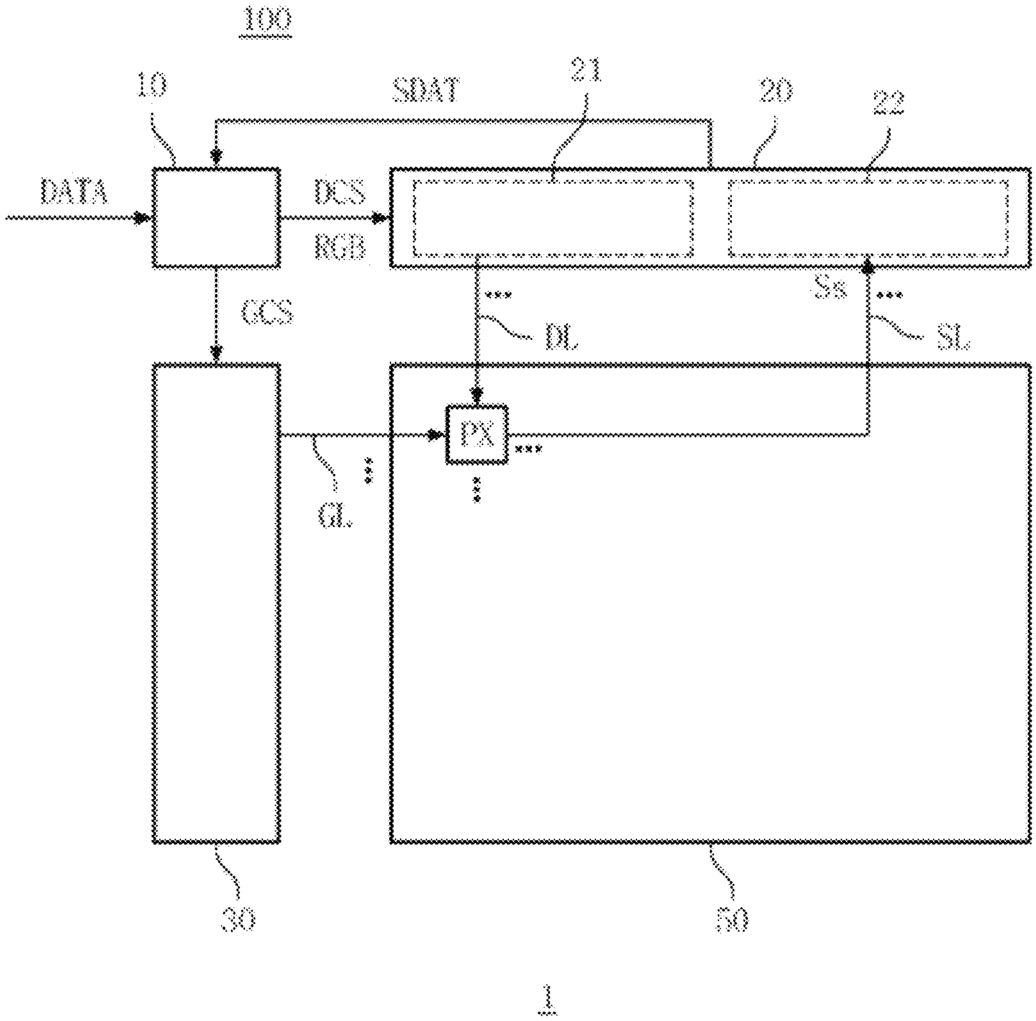

[FIG. 2]
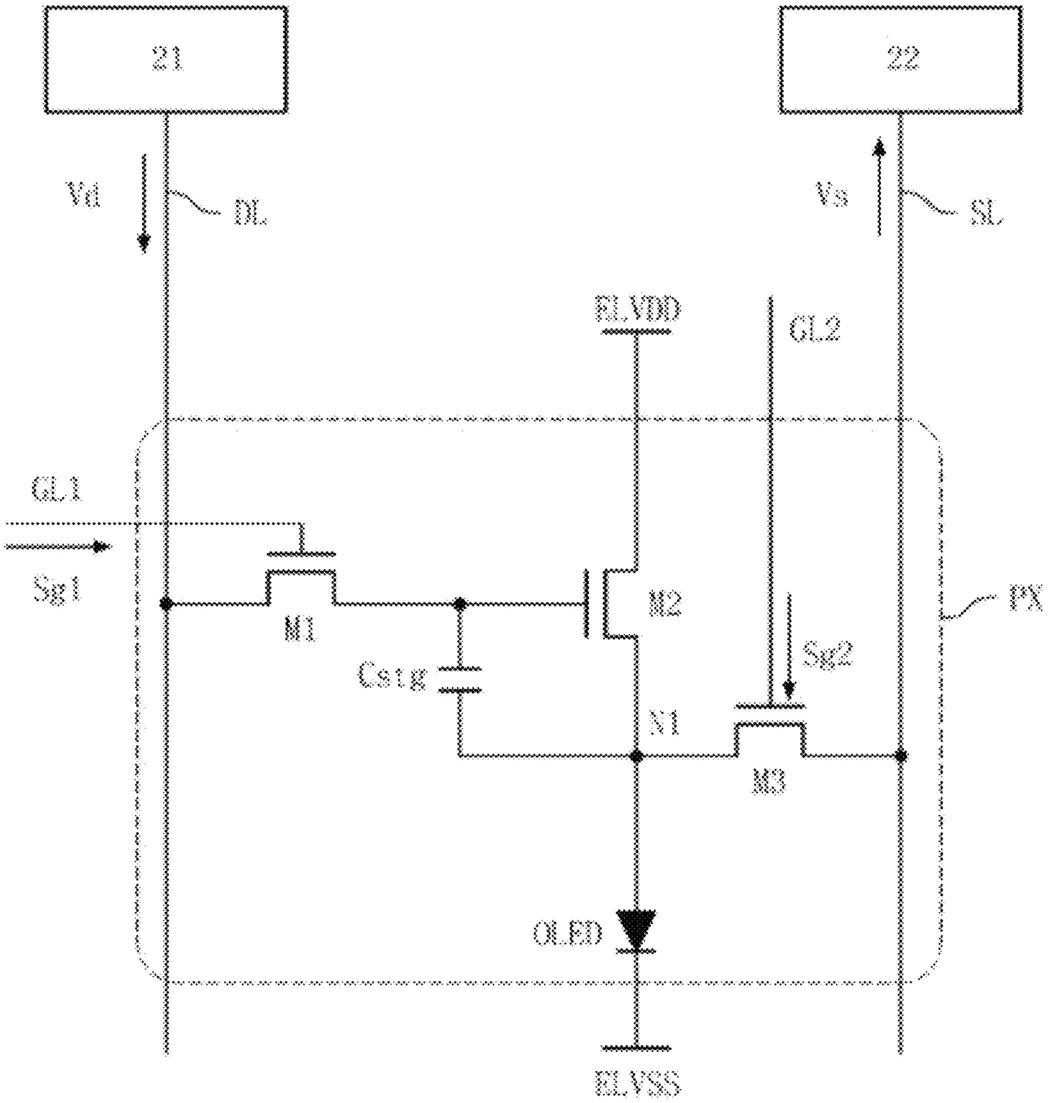

[FIG. 3]
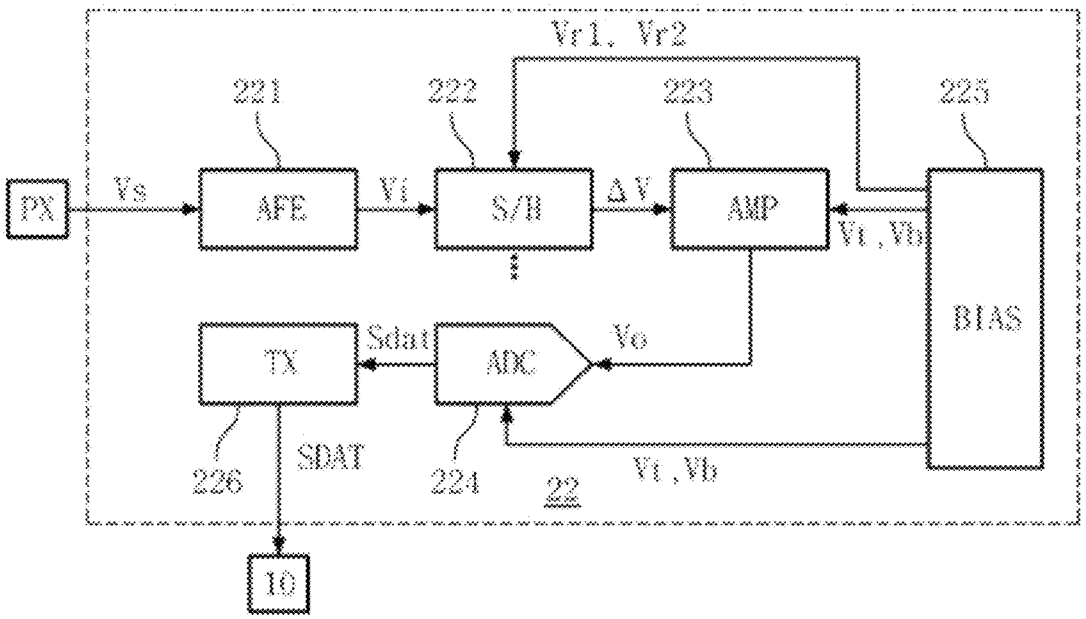

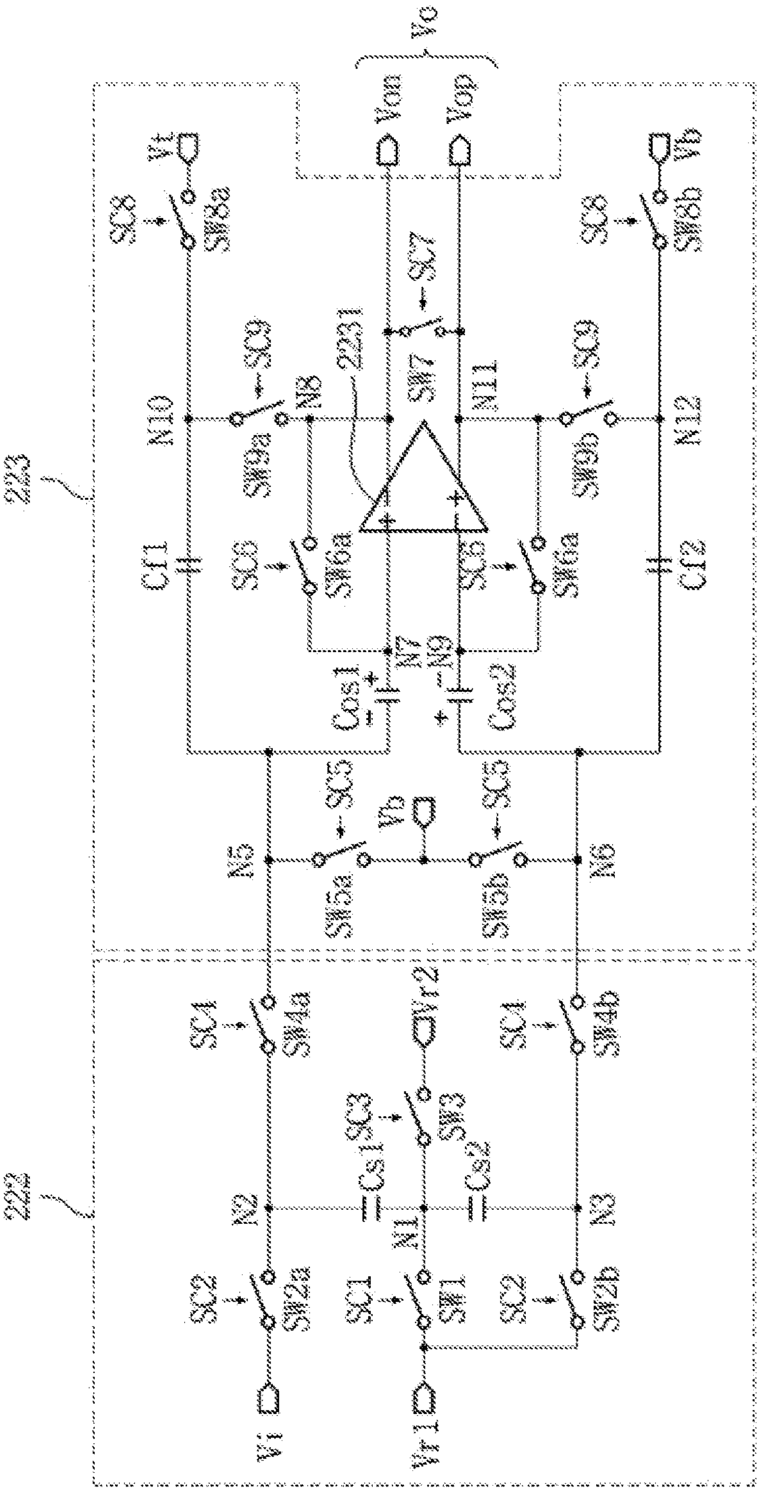
[FIG. 4]

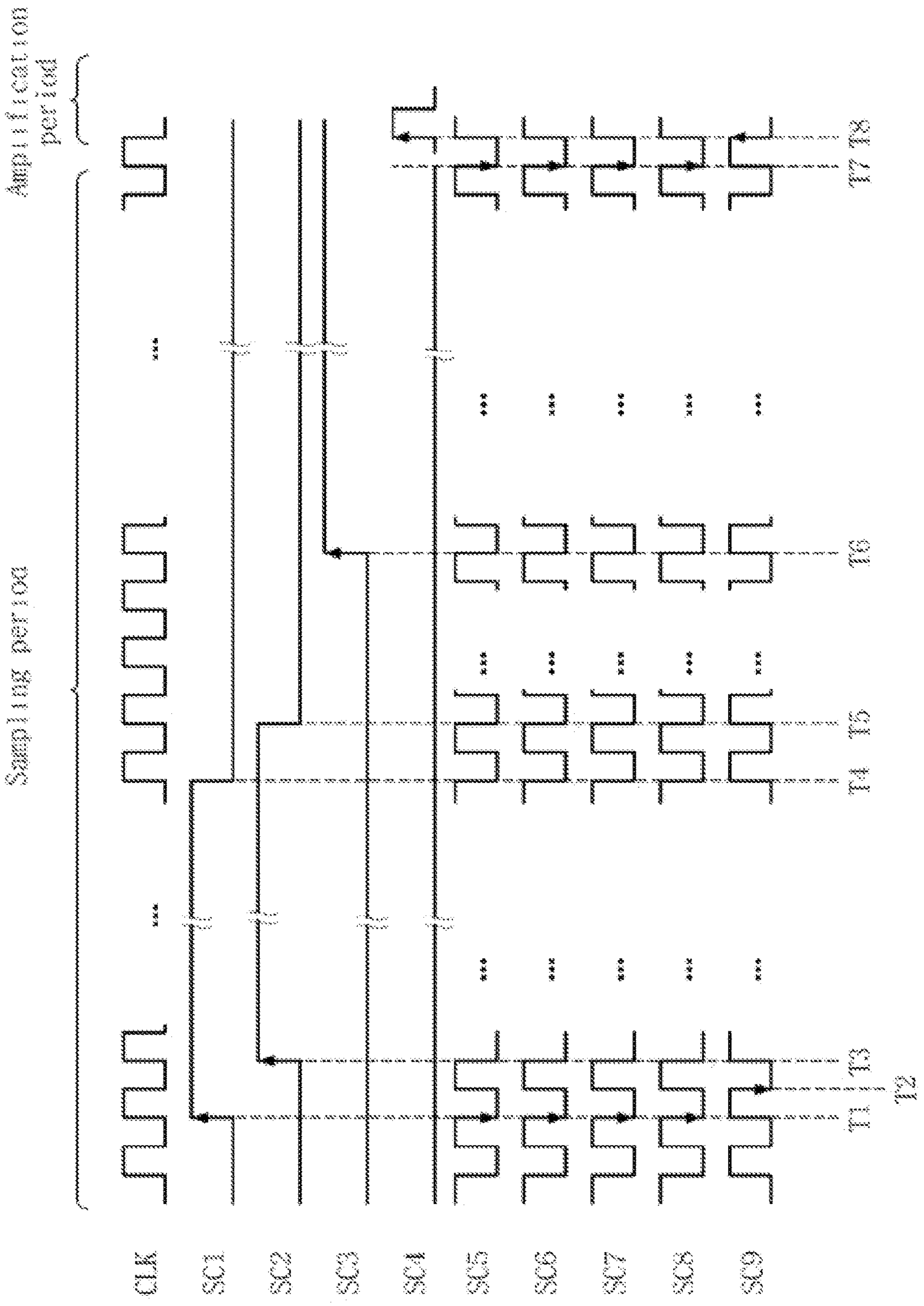
[FIG. 5]

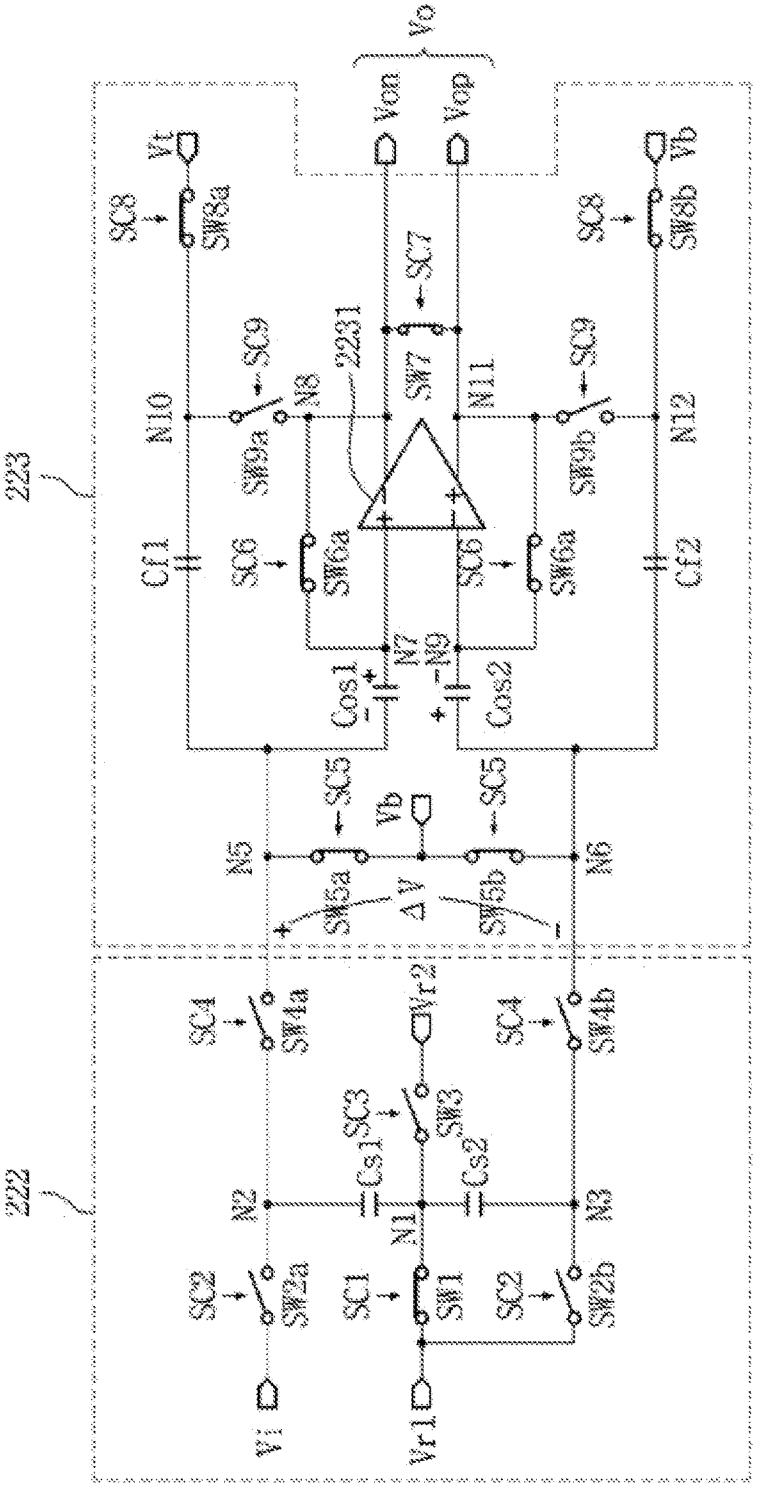
[FIG. 6]

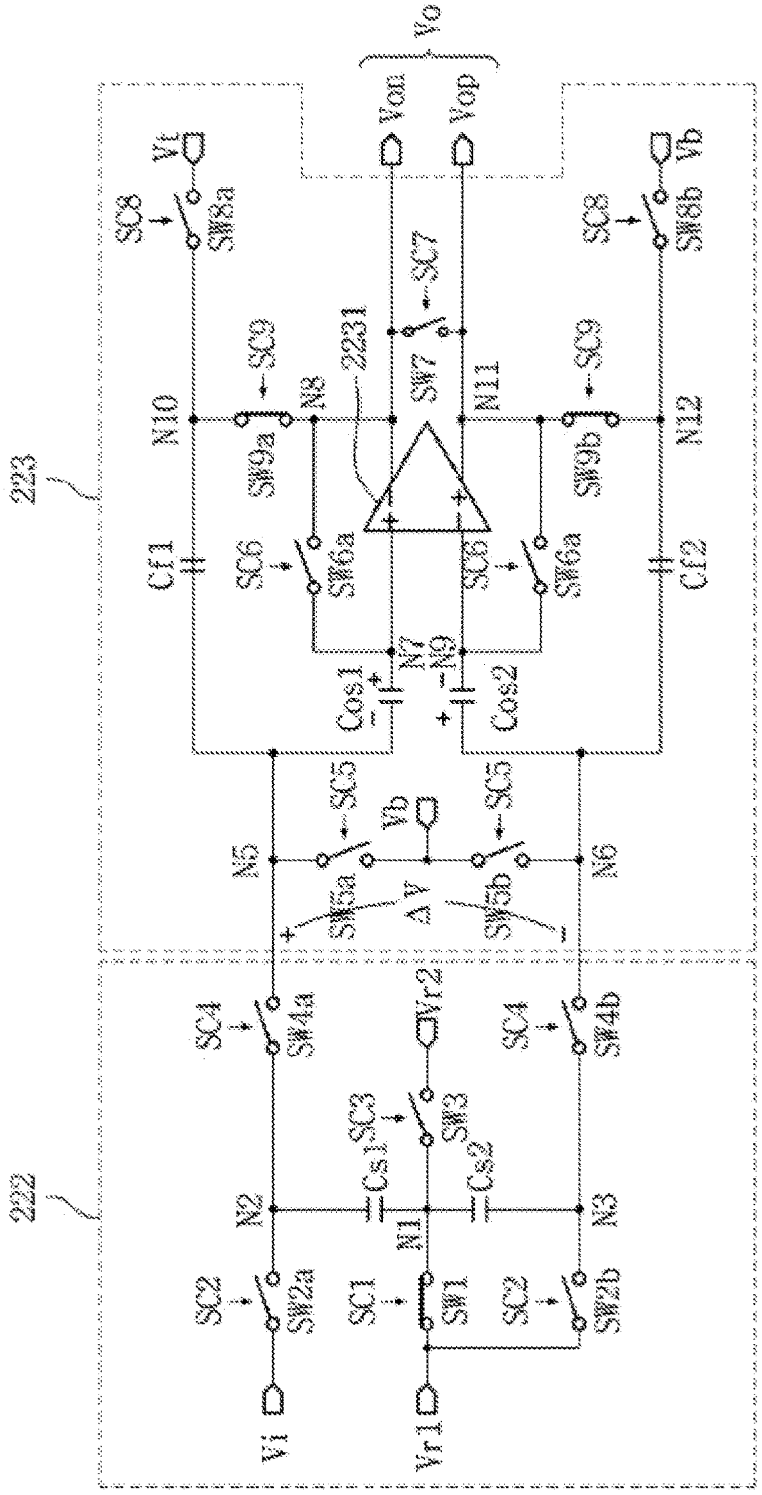
[FIG. 7]

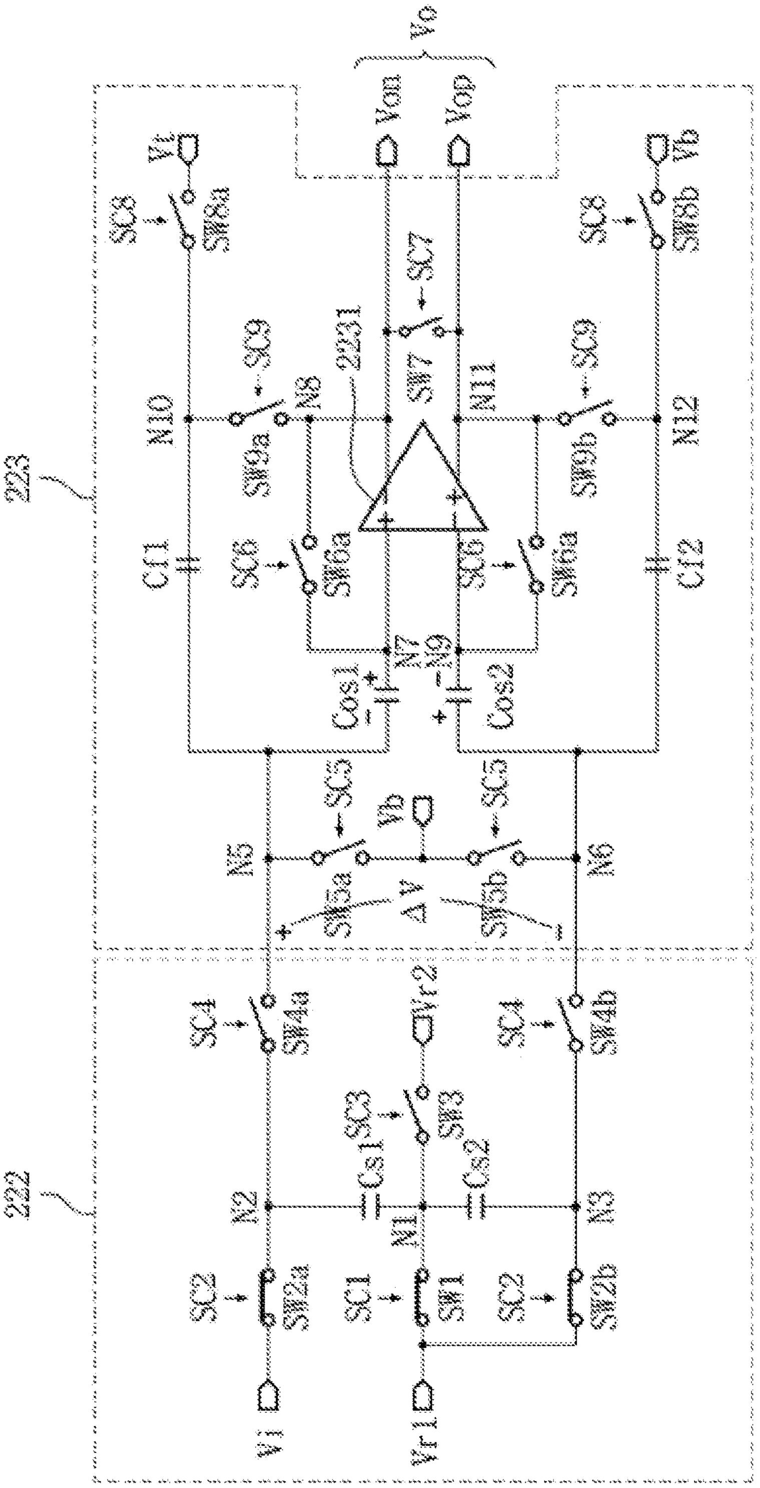
[FIG. 8]

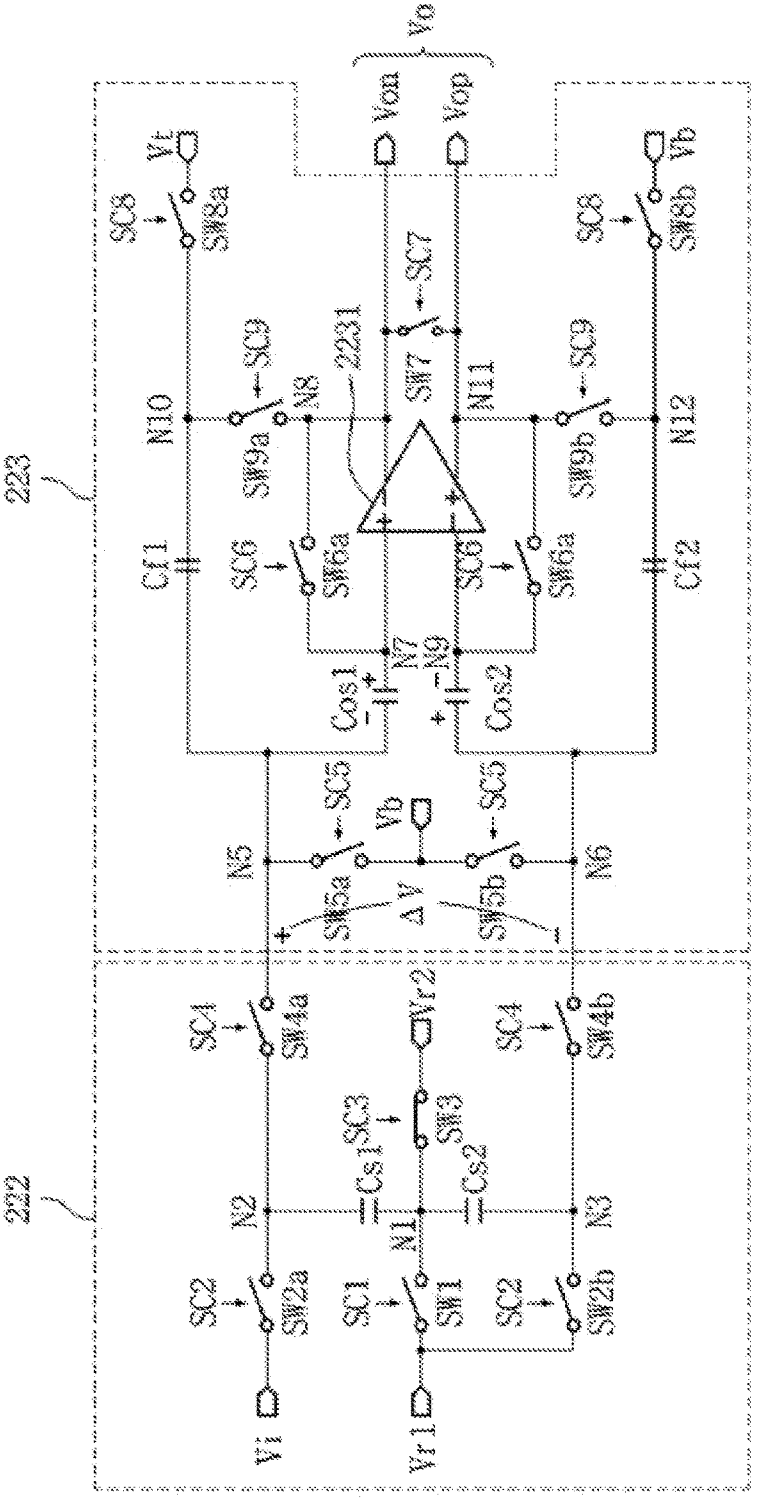
[FIG. 9]

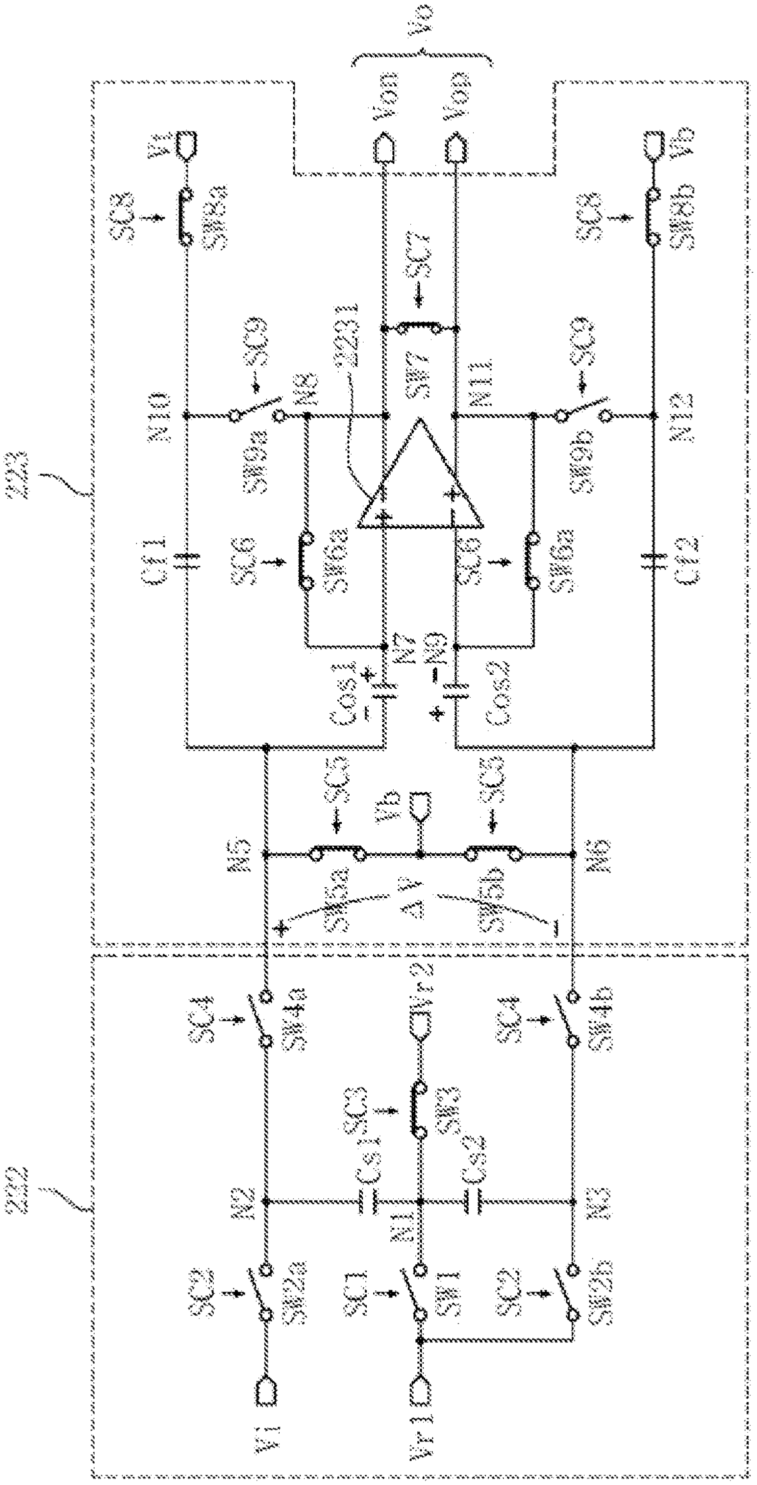
[FIG. 10]

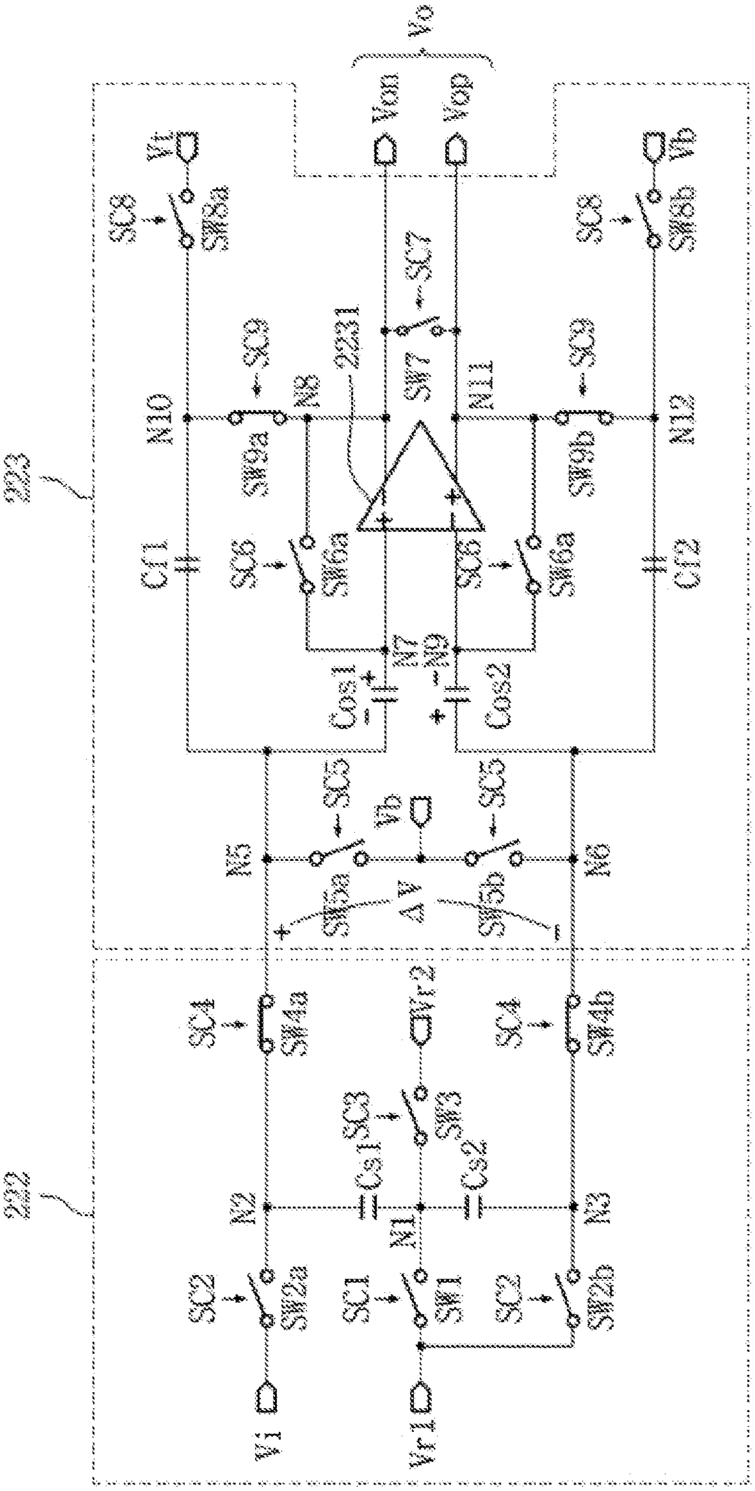
[FIG. 11]

[FIG. 12]
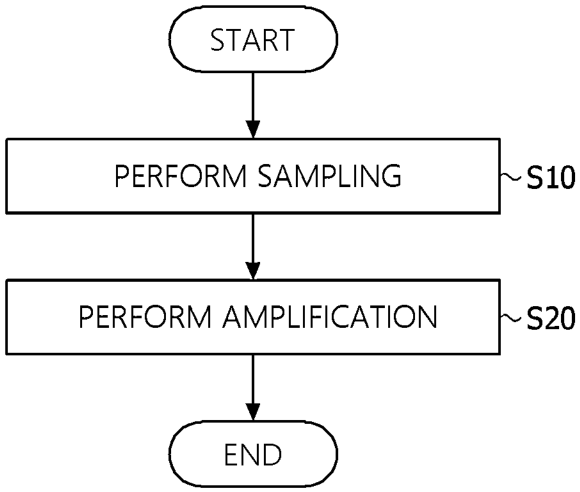

DATA DRIVER FOR DISPLAY AND SENSING CIRCUIT THEREOF

CROSS REFERENCE TO RELATED APPLICATION(S)

This application is a 35 U.S.C. § 371 National Phase Entry Application from PCT/KR2022/018317, filed on Nov. 18, 2022, which claims the benefit of Korean Patent Application No. 10-2021-0183645, filed on Dec. 21, 2021, the disclosures of which are herein incorporated by reference in their entirety.

TECHNICAL FIELD

The present invention relates to a display, and more specifically, to a data driver and a sensing circuit thereof.

BACKGROUND ART

Typically, a display device includes a data driver for driving pixels disposed on a panel. The data driver generates a data voltage according to image data and supplies the data voltage to the pixels to control the brightness of each pixel.

Meanwhile, the pixels may emit light with different brightness depending on their characteristics even when the same data voltage is supplied. For example, the pixels may include organic light-emitting elements and driving transistors. As the hours of use increase or the surrounding environment changes, characteristics of the organic light-emitting elements and the driving transistor may change. As an example, when a threshold voltage of the driving transistor changes, the brightness of the pixel may change even when the same data voltage is supplied. When the data driver provides a data voltage without considering a change in characteristics of these pixels, the pixels may be driven at undesired brightness and image quality may be degraded.

In order to solve the problem of image quality degradation, the conventional display device may include a pixel sensing device for sensing the characteristics of pixels. The pixel sensing device may include a plurality of channel circuits for measuring the characteristics of pixels of a panel for a short period of time. However, the plurality of channel circuits include many switches, resulting in a problem of increasing the size of a chip.

In addition, in the conventional data driver, input voltages corresponding to pixel signals of the characteristics of the sensed pixels change due to internal parasitic capacitance components, and thus a problem in that an internal sensing voltage generated in response to the input voltage becomes unstable occurs.

DETAILED DESCRIPTION

Technical Problem

The present invention is directed to providing a data driver circuit with a small chip size in which a structure of a switch for sensing pixel characteristics is improved The present invention is also directed to providing a data driver circuit that secures the linearity of a sensing voltage regardless of changes in input voltage.

The present invention is also directed to providing a data driver circuit capable of generating a sensing voltage regardless of an influence of an offset voltage.

Technical Solution

One aspect of the present invention provides a sensing circuit including an analog front end circuit configured to generate an input voltage corresponding to a pixel voltage of a sensed pixel; a sample-and-hold circuit configured to store a first sampling voltage corresponding to a voltage difference between the input voltage and a first reference voltage, generate a second sampling voltage by converting the first sampling voltage using a second reference voltage, and output the second sampling voltage; and an amplification circuit configured to amplify the second voltage sampling voltage to generate a sensing voltage, wherein the input voltage is higher than the first reference voltage and the second reference voltage, and the first reference voltage is lower than the second reference voltage.

Another aspect of the present invention provides a data driver including an analog front end circuit configured to generate an input voltage corresponding to a pixel voltage of a sensed pixel; a sample-and-hold circuit configured to store a first sampling voltage corresponding to the input voltage using a first reference voltage and output a second sampling voltage obtained by converting the first sampling voltage; an amplification circuit configured to amplify the second sampling voltage to generate a sensing voltage; and an analog-to-digital converter configured to output a digital signal corresponding to the sensing voltage.

Advantageous Effects

According to the present invention, there is an effect that can provide a data driver circuit with a small chip size in which a structure of a switch for sensing pixel characteristics is improved.

According to the present invention, there is an effect that can ensure linearity of a sensing signal regardless of changes in input voltage.

According to the present invention, there is an effect that can generate a sensing signal regardless of an influence of an offset voltage.

BRIEF DESCRIPTION OF DRAWINGS

FIG. 1 is a block diagram illustrating a configuration of a display device according to an embodiment.

FIG. 2 is a diagram illustrating a pixel circuit according to an embodiment.

FIG. 3 is a block diagram illustrating a configuration of a sensing circuit according to an embodiment.

FIG. 4 is a circuit diagram illustrating some components of the sensing circuit according to the embodiment.

FIG. 5 is a diagram illustrating an operation timing of the sensing circuit according to the embodiment.

FIGS. 6 to 11 are diagrams illustrating operations of the sensing circuit according to the embodiment.

FIG. 12 is a flowchart illustrating a method of driving a data drive according to an embodiment.

MODES OF THE INVENTION

FIG. 1 is a block diagram illustrating a configuration of a display device 1 according to an embodiment.

Referring to FIG. 1, the display device 1 includes a timing controller 10, a data driver 20, a gate driver 30, and a display panel 50.

The timing controller 10 may supply various control signals to the gate driver 30 and the data driver 20. For example, the timing controller 10 may generate a data control signal DCS and transmit the data control signal DCS to the data driver 20. The timing controller 10 may generate a gate control signal GCS, which starts scanning according to a timing implemented in each frame, and transmit the gate control signal GCS to the gate driver 30. The timing controller 10 may use externally input image data DATA to generate image data RGB which is converted according to a data signal format used by the data driver 20.

The timing controller 10 may generate a data control signal DCS which controls the data driver 20 to supply a data voltage to the pixel PX according to each timing. The timing controller may transmit the image data RGB and the data control signal DCS to the data driver 20. The timing controller 10 may compensate the image data RGB according to characteristics of a pixel PX using sensing data SDAT and transmit the compensated image data RGB.

The data driver 20 is connected to a plurality of data lines DL and a plurality of sensing lines SL. The data driver 20 may receive the image data RGB. The data driver 20 may process the image data RGB according to the data control signal DCS to generate a plurality of data signals. The data driver 20 may apply the plurality of data signals to corresponding data lines DL.

The data driver 20 may receive pixel signals Ss from pixels PX through the plurality of sensing lines SL and generate the sensing data SDAT using the pixel signals Ss. For example, the data driver 20 may receive a pixel signal Ss corresponding to a voltage of node N1 (see FIG. 2) and generate sensing data SDAT for the pixel PX corresponding to the pixel signal Ss. The sensing data SDAT may be understood as including information related to the characteristics of the light-emitting element and the transistor included in the pixel PX. The data driver 20 may transmit the sensing data SDAT to the timing controller 10.

For the convenience of description, one data driver 20 is shown in FIG. 1, but the embodiment is not limited thereto. The display device 1 may include a plurality of data drivers 20 according to a size and resolution of the display panel 50. In addition, the data driver 20 may include a data driving circuit 21 and a sensing circuit 22. The data driving circuit 21 and the sensing circuit 22 may be included in one integrated circuit.

The data driving circuit 21 may process the image data RGB according to the data control signal DCS to generate a plurality of data signals Vd.

The sensing circuit 22 may be connected to each pixel PX. The sensing circuit 22 may be provided as a plurality of sensing circuits to correspond to the plurality of pixels PX. The sensing circuit 22 may sense the pixel signal Ss, that is, a pixel voltage Vs (see FIG. 2) of node N1 according to a gate signal Sg2 (see FIG. 2). The sensing circuit 22 may sense a change in characteristics of pixel PX using the pixel voltage Vs. A detailed configuration of the sensing circuit 22 will be described below. The pixel voltage Vs may be understood as including information related to the degradation of the light-emitting element OLED, such as a threshold voltage and mobility of a transistor M2 (see FIG. 2), and a parasitic capacitance and current characteristics of the light-emitting element OLED.

The gate driver 30 is connected to the plurality of gate lines GL. The gate driver 30 may generate a plurality of gate signals according to the gate control signal GCS. The gate driver 30 may apply the plurality of gate signals to corresponding gate lines GL among the plurality of gate lines GL. One gate driver 30 is shown in FIG. 1, but the embodiment is not limited thereto. The display device 1 may include a plurality of gate drivers 30 according to the size and resolution of the display panel 50.

The display panel 50 may include the plurality of data lines DL, the plurality of gate lines GL, and the plurality of sensing lines SL. The display panel 50 includes the plurality of pixels PX. Each pixel PX is connected to a corresponding gate line GL and a corresponding data line DL.

The pixel PX may emit light in response to the data signal Vd supplied according to a gate signal Sg1. The pixel PX may include an organic light-emitting diode (OLED) and a plurality of transistors, but the embodiment is not limited thereto. The characteristics of the light-emitting element OLED and the transistor of the pixel PX may change according to the hours of use or the surrounding environment change.

Hereinafter, the pixel PX will be described with reference to FIG. 2.

Referring to FIG. 2, the pixel PX may include a transistor M1, the transistor M2, a transistor M3, the light-emitting element OLED, and a storage capacitor Cstg.

The transistor M1 may transmit the data signal Vd, which is applied through a data line DL, to a gate of the transistor M2 in response to the gate signal Sgl applied to the gate through a gate line GL1. The transistor M1 may be an n-type metal oxide semiconductor field effect transistor (nMOSFET). When the transistor M1 is turned on, a voltage corresponding to the data signal Vd is applied to the gate of the transistor M2.

The transistor M2 is a driving transistor for driving the light-emitting element OLED. The transistor M2 may include a source connected to a cathode of the light-emitting element OLED through node N1, a drain connected to the first driving power supply ELVDD, and the gate connected to a source of the transistor M1. The transistor M2 may be an nMOSFET. The transistor M2 may control the brightness of the light-emitting element OLED by controlling a driving current supplied to the light-emitting element OLED in response to a voltage applied to the gate of the transistor M2.

It can be understood that the storage capacitor Cstg is disposed between the gate of the transistor M2 and node N1. The storage capacitor Cstg may be a parasitic capacitor formed between node N1 and node N2 or an external capacitor intentionally designed outside the transistor M2. It can be understood that the storage capacitor Cstg charges a voltage between the gate and the source of the transistor M2.

The transistor M3 is a sensing transistor for sensing the characteristics of the light-emitting element OLED. The transistor M3 includes a source connected to node N1 between the source of the transistor M2 and the anode of the light-emitting element OLED, a drain connected to the sensing line SL, and a gate connected to a gate line GL2. The turn-on of the transistor M3 may be controlled according to the gate signal Sg2 applied through the gate line GL2. The transistor M3 may be an nMOSFET.

When the transistor M3 is turned on, node N1 and the sensing line SL are connected. For example, when the transistor M2 is turned on and a driving current is supplied to the light-emitting element OLED, the sensing circuit 22 may sense the pixel voltage Vs through the sensing line SL. In this case, the pixel voltage Vs is a voltage applied to node N1 through the turned-on transistor M2 or a voltage corresponding to a current flowing through node N1 and may be transmitted to the sensing circuit 22 through the turned-on transistor M3 and the sensing line SL. That is, it can be understood that the pixel voltage Vs is the voltage applied to node N1 or the current flowing through node N1. Therefore, it may be understood that the pixel voltage Vs is a voltage corresponding to the characteristics of the OLED and the plurality of transistors of the pixel PX.

The light-emitting element OLED includes the cathode connected to a second driving power supply ELVSS and the anode connected to node N1. The light-emitting element OLED may emit light using the driving current supplied through the transistor M2.

Hereinafter, the sensing circuit 22 according to the embodiment will be described with reference to FIG. 3.

FIG. 3 is a block diagram illustrating a configuration of the sensing circuit 22 according to the embodiment.

Referring to FIG. 3, the sensing circuit 22 includes an analog front end circuit (AFE) 211, a sample-and-hold circuit (S/H) 222, an amplification circuit (AMP) 223, an analog-to-digital converter (ADC) 224, a bias voltage supply circuit (BIAS) 225, and a data transmitter (TX) 226.

The AFE 221 may generate an input voltage Vi corresponding to the pixel voltage Vs provided by the pixel PX. The input voltage Vi may be the same as the pixel voltage Vs or may be a voltage obtained by converting a current corresponding to the pixel voltage Vs by integration or the like. It can be understood the AFE 221 is a circuit that reads out the pixel voltage Vs and may supply the input voltage Vi to the S/H 222.

The S/H 222 may be provided between the AFE 221 and the AMP 223. The S/H 222 may sample and hold the input voltage Vi of the AFE 221. The sampling and holding may be expressed as storage for understanding of the embodiment. More specifically, the S/H 222 may store a first sampling voltage corresponding to a voltage difference between a first reference voltage Vr1 and the input voltage Vi. The S/H 222 may store the first sampling voltage obtained by sampling and holding the input voltage Vi using the first reference voltage Vr1, generate a second sampling voltage ΔV (see FIG. 6) by converting the first sampling voltage using a second reference voltage Vr2 of a fixed level, and output the second sampling voltage ΔV to the AMP 223. The input voltage Vi is a voltage that is higher than the first reference voltage Vr1 and the second reference voltage Vr2, and the first reference voltage Vr1 is a voltage that is higher than the second reference voltage Vr2. Even when the input voltage Vi changes due to internal parasitic capacitance components, the S/H 222 may output the second sampling voltage ΔV while maintaining the constant second sampling voltage ΔV using the second reference voltage Vr2 of a fixed level. A detailed configuration of the S/H 222 will be described below.

The AMP 223 may amplify the second sampling voltage ΔV to generate a sensing voltage Vo. The AMP 223 may have a gain and an offset for amplification. Hereinafter, for the convenience of description, the gain and the offset of the AMP 223 are referred to as an amplification gain and an amplification offset, respectively. In addition, a gain and an offset of the ADC 224 are referred to as a conversion gain and a conversion offset, respectively. A detailed configuration of the AMP 223 will be described below.

The ADC 224 may generate a digital signal Sdat by converting the sensing voltage Vo. For example, the ADC 224 may generate an output code, which corresponds to an integration result of the sensing voltage Vo, as the digital signal Sdat. The ADC 224 may have a gain and an offset for signal conversion.

The BIAS 225 may supply a first driving voltage Vt, a second driving voltage Vb, the first reference voltage Vr1, and the second reference voltage Vr2 and adjust levels thereof. The BIAS 225 may adjust one or more of an amplification gain, an amplification offset, a conversion gain, and a conversion offset by supplying the first driving voltage Vt and the second driving voltage Vb, which have adjusted voltage levels, to the AMP 223 and/or the ADC 224. The BIAS 225 may generate the first driving voltage Vt and the second driving voltage Vb to drive the AMP 223 and the ADC 224. The BIAS 225 may adjust one or more of the amplification gain, the amplification offset, the conversion gain, and the conversion offset by adjusting the levels of the first driving voltage Vt and the second driving voltage Vb. The BIAS 225 may supply the first reference voltage Vr1 and the second reference voltage Vr2 to the S/H 222.

The TX 226 may generate sensing data SDAT corresponding to the digital signal Sdat. As an example, the TX 226 may transmit the sensing data SDAT, in which a preset amount of digital signal Sdat is constituted as a packet, to the timing controller 10.

Hereinafter, configurations of the S/H 222 and the AMP 223 according to the embodiment will be described with reference to FIG. 4.

Referring to FIG. 4, the S/H 222 may store a first sampling voltage corresponding to a voltage difference between the first reference voltage Vr1 and the input voltage Vi. The S/H 222 may generate the second sampling voltage ΔV by converting the first sampling voltage using the second reference voltage Vr2 of a fixed level. The S/H 222 may apply the second sampling voltage ΔV between node N5 and node N6 to output the second sampling voltage ΔV to the AMP 223.

During a sampling period, the S/H 222 may store the first sampling voltage corresponding to the voltage difference between the first reference voltage Vr1 and the input voltage Vi. The S/H 222 may apply the second sampling voltage ΔV to the AMP 223 by converting the first sampling voltage using the second reference voltage Vr2 of a fixed level during the sampling period. The S/H 222 may include switches SW1, SW2*a*, SW2*b*, SW3, SW4*a*, and SW4*b*, a first sampling capacitor Cs1, and a second sampling capacitor Cs2. An operation of the S/H 222 during the sampling period will be described below.

The switch SW1 is connected between a first reference voltage input terminal, to which the first reference voltage Vr1 is input, and node N1 and may transmit the first reference voltage Vr1 to node N1. A switching operation of the switch SW1 may be controlled according to a first switching control signal SC1. The switch SW1 may be turned on according to the first switching control signal SC1 of an enable level to apply the first reference voltage Vr1 to node N1.

The switch SW2*a* is connected between an input terminal, to which the input voltage Vi is applied, and node N2 and may transmit the input voltage Vi to node N2. A switching operation of the switch SW2*a* may be controlled according to a second switching control signal SC2. The switch SW2*a* may be turned on according to the second switching control signal SC2 of an enable level to apply the input voltage Vi to node N2.

The switch SW2*b* is connected between the first reference voltage input terminal, to which the first reference voltage Vr1 is input, and node N3, may transmit the first reference voltage Vr1 to node N3, and is connected to the switch SW1 in parallel with respect to the first reference voltage input terminal. A switching operation of the switch SW2*b* may be controlled according to the second switching control signal SC2. The switch SW2*b* may be turned on according to the second switching control signal SC2 of an enable level to apply the first reference voltage Vr1 to node N3.

The switch SW3 is connected between node N1 and a second reference voltage input terminal, to which the second reference voltage Vr2 is input, and may transmit the second reference voltage Vr2 of a fixed level to node N1. A switching operation of the switch SW3 may be controlled according to a third switching control signal SC3. The switch SW3 may be turned on according to the third switching control signal SC3 of an enable level to apply the second reference voltage Vr2 to node N1. When the switch SW3 is omitted, a first parasitic capacitor between node N1 and node N2 and a second parasitic capacitor between node N1 and node N3 affect the first sampling voltage. That is, the capacitance of the first parasitic capacitor and the capacitance of the second parasitic capacitor change according to a change in input voltage Vi. According to the change in parasitic capacitance, the linearity of the second sampling voltage ΔV decreases. Therefore, when the voltage of node N1 is fixed to the second reference voltage Vr2 by turning the switch SW3 on, the constant parasitic capacitance can be maintained. Thus, it can be understood that the switch SW3 provides a function of maintaining the linearity of the second sampling voltage ΔV.

The switch SW4*a* is connected between node N2 and node N5. A switching operation of the switch SW4*a* may be controlled according to a fourth switching control signal SC4.

The switch SW4*b* is connected between node N3 and node N6. A switching operation of the switch SW4*b* may be controlled according to the fourth switching control signal SC4. The switches SW4*a* and SW4*b* may be turned on according to the fourth switching control signal SC4 of an enable level to apply the second sampling voltage ΔV between node N5 and node N6. It can be understood that the switches SW4*a* and SW4*b* provide a function of switching an output of the second sampling voltage ΔV from the S/H 222.

The first sampling capacitor Cs1 is connected between node N1 and node N2. A voltage corresponding to a difference between the voltage of node N1 and the voltage of node N2 may be charged in the first sampling capacitor Cs1.

The second sampling capacitor Cs2 is connected between node N1 and node N6. A voltage corresponding to a difference between the voltage of node N1 and the voltage of node N3 may be charged in the second sampling capacitor Cs2.

Therefore, the S/H 222 according to the embodiment may be constituted using a small number of switches, and as a result, a size of the data driving circuit 21 can be reduced.

In addition, the S/H 222 according to the embodiment may output the second sampling voltage ΔV by converting the first sampling voltage using the second reference voltage Vr2 in a state in which the switches SW1, SW2*a,* and SW2*b* are turned off to block an influence of the input so that the linearity of the second sampling voltage ΔV can be maintained.

During an amplification period, the AMP 223 may amplify the second sampling voltage ΔV to generate the sensing voltage Vo. The AMP 223 includes switches SW5*a*, SW5*b,* SW6*a,* SW6*b,* SW7, SW8*a,* SW8*b,* SW9*a,* and SW9*b*, a first offset capacitor Cos1, a second offset capacitor Cos2, a first feedback capacitor Cf1, a second feedback capacitor Cf2, and an amplifier 2231. An operation of the AMP 223 during the amplification period will be described below.

The switch SW5*a* is connected between node N5 and a second driving voltage input terminal. A switching operation of the switch SW5*a* is controlled according to a switching control signal SC5 and may transmit the second driving voltage Vb to node N5.

The switch SW5*b* is connected between node N6 and the second driving voltage input terminal. A switching operation of the switch SW5*b* is controlled according to the switching control signal SC5 and may transmit the second driving voltage Vb to node N6.

The switch SW6*a* is connected between node N7 connected to a first input terminal of the amplifier 2231 and node N8 connected to a first output terminal of the amplifier 2231. A switching operation of the switch SW6*a* may be controlled according to a switching control signal SC6.

The switch SW6*b* is connected between node N9 connected to a second input terminal of the amplifier 2231 and node N11 connected to a second output terminal of the amplifier 2231. A switching operation of the switch SW6*b* may be controlled according to the switching control signal SC6.

The switch SW7 is connected between node N8 and node N11. A switching operation of the switch SW7 may be controlled according to a switching control signal SC7.

The switch SW8*a* is connected between node N10 and an input terminal of the first driving voltage Vt. A switching operation of the switch SW8*a* may be controlled according to a switching control signal SC8.

The switch SW8*b* is connected between node N12 and the second driving voltage input terminal. The switching operation of the switch SW8*b* may be controlled according to the switching control signal SC8.

The switch SW9*a* is connected between node N8 and node N10. A switching operation of the switch SW9*a* may be controlled according to a switching control signal SC9.

The switch SW9*b* is connected between node N11 and node N12. The switching operation of the switch SW9*b* may be controlled according to the switching control signal SC9.

The first offset capacitor Cos1 is connected between node N5 and node N7 of the first input terminal of the amplifier 2231.

The second offset capacitor Cos2 is connected between node N6 and node N9 of the second input terminal of the amplifier 2231.

The first feedback capacitor Cf1 is connected between node N5 and node N10.

The second feedback capacitor Cf2 is connected between node N6 and node N12.

The amplifier 2231 includes the first input terminal connected to node N7, for example, a non-inverted input terminal, the second input terminal connected to node N9, for example, an inverted input terminal, the first output terminal connected to node N8, for example, an inverted output terminal, and the second output terminal connected to node N11, for example, a non-inverted output terminal. The amplifier 2231 may generate a first amplifier output voltage Von and apply the first amplifier output voltage Von to node N8 connected to the first output terminal. The amplifier 2231 may generate a second amplifier output voltage Vop and apply the second amplifier output voltage Vop to node N11 connected to the second output terminal. That is, the amplifier 2231 may generate a sensing voltage Vo corresponding to a difference between the first amplifier output voltage Von and the second amplifier output voltage Vop. The amplifier 2231 may be formed using an operational amplifier.

Hereinafter, operations of the sensing circuit 22 according to the embodiment will be described with reference to FIGS. 5 to 10.

FIG. 5 is a diagram illustrating an operation timing of the sensing circuit 22 according to the embodiment.

FIGS. 6 to do 10 are diagrams illustrating operations of the sensing circuit 22 according to the embodiment.

Referring to FIG. 5, an operation timing of the S/H 222 during the sampling period and an operation timing of the AMP 223 during the amplification period are shown.

The sampling period is a time from a time point T1 to a time point T7. During the sampling period, the S/H 222 may apply the second sampling voltage ΔV to the AMP 223.

In addition, during the sampling period, the AMP 223 stores a voltage, which corresponds to the first offset voltage Vos1 generated at the input terminal of the amplifier 2231, in the first offset capacitor Cos1. In addition, during the sampling period, the AMP 223 stores a voltage, which corresponds to the second offset voltage Vos2 generated at the input terminal of the amplifier 2231, in the second offset capacitor Cos2.

The amplification period is a time from the time point T7 to a time point T8, and during the amplification, the AMP 223 may amplify the second sampling voltage ΔV to generate the sensing voltage Vo.

Referring to FIGS. 5 and 6, at the time point T1 of the sampling period, the S/H 222 operates to sample the input voltage Vi and, to this end, the switch SW1 is first turned on, and the remaining switches SW2*a*, SW2*b*, SW3, SW4*a*, and SW4*b* of the S/H 222 are turned off. In this case, the switches SW5*a*, SW5*b*, SW6*a*, SW6*b*, SW7, SW8*a*, and SW8*b* are turned on and the switches SW9*a* and SW9*b* are turned off, which are included in the AMP 223.

To describe in detail, at the time point T1, the switch SW1 is turned on according to an enable level, for example, the first switching control signal SC1 of a high level. The first reference voltage Vr1 is applied to node N1 through the turned-on switch SW1, and a voltage corresponding to the first reference voltage Vr1 is charged in the first sampling capacitor Cs1. At the time point T4, the switch SW1 is turned off according to the first switching control signal SC1 of a disable level.

In addition, at the time point T1, the switch SW5*a* is turned on according to an enable level, for example, the switching control signal SC5 of a low level. The second driving voltage Vb is applied to node N5 through the turned-on switch SW5*a*.

At the time point T1, the switch SW5*b* is turned on according to the enable level, for example, the switching control signal SC5 of the low level. The second driving voltage Vb is applied to node N6 through the turned-on switch SW5*b*. By turning the switches SW5*a* and SW5*b* on, nodes N5 and N6 have a voltage level of the second driving voltage Vb.

In addition, at the time point T1, the switch SW6*a* is turned on according to an enable level, for example, the switching control signal SC6 of a low level. By turning the switch SW6*a* on, the amplifier 2231 may serve as a unity gain buffer. The first offset voltage Vos1 of a positive input terminal (+) of the amplifier 2231 is directly transmitted to the first output terminal, that is, node N8. As the positive input terminal (+) and a negative output terminal (−) of the amplifier 2231 are connected, a voltage output from the negative output terminal (−) of the AMP 223 is stored in the first offset capacitor Cos1. Therefore, a voltage with the same magnitude and an opposite sign as the first offset voltage Vos1 generating at the positive input terminal of the amplifier 2231 is stored in the first offset capacitor Cos1. In this case, an amplification factor of the amplifier 2231 may be 1.

At the time point T1, the switch SW6*b* is turned on according to the enable level, for example, the switching control signal SC6 of the low level. By turning the switch SW6*b* on, the amplifier 2231 may serve as a unity gain buffer. The second offset voltage Vos2 of a negative (−) input terminal of the amplifier 2231 is directly transmitted to the second output terminal, that is, node N11. As the negative input terminal (−) and the positive output terminal (+) of the amplifier 2231 are connected, a voltage output from the positive output terminal (+) of the amplifier 2231 is stored in the offset capacitor Cos2. That is, a voltage with the same magnitude and an opposite sign as the second offset voltage Vos2 generated at the negative input terminal (−) of the amplifier 2231 is stored in the second offset capacitor Cos2. In this case, the amplification factor of the amplifier 2231 may be 1.

In addition, at the time point T1, the switch SW7 is turned on according to an enable level, for example, the switching control signal SC7 of a low level. Node N8 and node N11 are connected through the turned-on switch SW7. Accordingly, as the negative output terminal and the positive output terminal of the amplifier 2231 are connected through the switch SW7, the output of the amplifier 2231, that is, the sensing voltage Vo, is reset. That is, the voltages of the first and second input terminals of the amplifier 2231 are reset to a common mode voltage by the turned-on switch SW7.

In addition, at the time point T1, the switch SW8*a* is turned on according to an enable level, for example, the switching control signal SC8 of a low level. The switch SW9*a* is turned off according to a disable level, for example, the switching control signal SC9 of a high level. Due to the turned-off switch SW9*a*, the first feedback capacitor Cf1 is separated from the negative output terminal of the amplifier 2231. By turning the switch SW5*a* and switch SW8*a* on, a voltage corresponding to a difference between the first driving voltage Vt and the second driving voltage Vb is stored in the first feedback capacitor Cf1.

At the time point T1, the switch SW8*b* is turned on according to the enable level, for example, the switching control signal SC8 of the low level. The switch SW9*b* is turned off according to the disable level, for example, the switching control signal SC9 of the high level. Due to the turned-off switch SW9*b*, the second feedback capacitor Cf2 is separated from the positive output terminal of the amplifier 2231. By turning the switches SW5*b* and SW8*b* on, a voltage corresponding to a difference between the second driving voltages Vb at both ends is stored in the second feedback capacitor Cf2.

Referring to FIGS. 5 and 7, at the time point T2 of the sampling period, the switches SW9*a* and SW9*b* of the AMP 223 are turned on, and the switches SW2*a*, SW2*b*, SW3*a*, SW3*b*, SW4*a*, SW4*b*, SW5*a*, SW5*b*, SW6*a*, SW6*b*, SW7, SW8*a*, and SW8*b* are turned off. In addition, the switch SW1 of the S/H 222 is maintained in the turned-on state.

To describe in detail, at the time point T2, the switch SW9*a* is turned on according to the enable level, for example, the switching control signal SC9 of the low level. Through the turned-on switch SW9*a*, the first feedback capacitor Cf1 is connected to the negative output terminal of the amplifier 2231 and separated from the first driving voltage Vt. In addition, the first feedback capacitor Cf1 is connected to the first sampling capacitor Cs1 in series to form a feedback loop of the amplifier 2231. The offset voltage stored in the first offset capacitor Cos1 has the same potential as the first offset voltage Vos1 of the positive input terminal (+) of the amplifier 2231 and has an opposite polarity. Therefore, the offset voltage stored in the first offset capacitor Cos1 and the first offset voltage Vos1 of the positive input terminal (+) of the amplifier 2231 are offset. That is, the amplifier 2231 may amplify and output a signal without being affected by the first offset voltage Vos1 generated at the positive input terminal (+).

At the time point T2, the switch SW9*b* is turned on according to the enable level, for example, the switching control signal SC9 of the low level. Through the turned-on switch SW9*b,* the second feedback capacitor Cf2 is connected to the positive output terminal of the amplifier 2231 and separated from the second driving voltage Vb. In addition, the second feedback capacitor Cf2 is connected to the second sampling capacitor Cs2 in series to form a feedback loop of the amplifier 2231. The offset voltage stored in the second offset capacitor Cos2 has the same potential as the second offset voltage Vos2 of the negative input terminal (−) of the amplifier 2231 and has an opposite polarity. Therefore, the offset voltage stored in the second offset capacitor Cos2 and the second offset voltage Vos2 of the negative input terminal (−) of the amplifier 2231 are offset. That is, the amplifier 2231 may amplify and output a signal without being affected by the second offset voltage Vos2 generated at the negative input terminal (−).

Referring to FIGS. 5 and 8, the switches SW2*a* and SW2*b* are turned on at the time point T3 of the sampling period. The switch SW1 is maintained in the turned-on state.

To describe in detail, at the time point T3, the switches SW2*a* and SW2*b* are turned on according to the enabling level, for example, the switching control signal SC2 of a high level. The input voltage Vi is applied to node N2 according to the turned-on switch SW2*a,* and the first reference voltage Vr1 is applied to node N3 according to the turned-on switch SW2*b*. Therefore, the first sampling voltage corresponding to a voltage difference between the input voltage Vi and the first reference voltage Vr1 is charged in the first sampling capacitor Cs1.

Referring to FIGS. 5 and 9, the switch SW3 is turned on at the time point T6 of the sampling period. In this case, the switches SW1, SW2*a,* and SW2*b* are turned off.

To describe in detail, at the time point T6, the switch SW3 is turned on according to the enable level, for example, the switching control signal SC3 of the high level. The second reference voltage Vr2 of a fixed level is applied to node N1 according to the turned-on switch SW3. A voltage corresponding to a voltage difference between the input voltage Vi and the second reference voltage Vr2 is charged in the first sampling capacitor Cs1. A voltage corresponding to a voltage difference between the first reference voltage Vr1 and the second reference voltage Vr2 is charged in the second sampling capacitor Cs2. In this case, a voltage difference between node N2 and node N3 may be defined as the second sampling voltage ΔV.

Hereinafter, an operation of the AMP 223 during the amplification period will be described with reference to FIGS. 5 and 10.

Referring to FIGS. 5 and 10, at the time point T7, the switches SW5*a*, SW5*b*, SW6*a*, SW6*b*, SW7, SW8*a*, and SW8*b* are turned on, and the switches SW1, SW2*a*, SW2*b*, SW4*a*, SW4*b*, SW9*a*, and SW9*b* are turned off. The switch SW3 is maintained in the turned-on state.

To describe in detail, at the time point T7, the switch SW5*a* is turned on according to the enable level, for example, the switching control signal SC5 of the low level. The second driving voltage Vb is applied to node N5 through the turned-on switch SW5*a*.

At the time point T7, the switch SW5*b* is turned on according to the enable level, for example, the switching control signal SC5 of the low level. The second driving voltage Vb is applied to node N6 through the turned-on switch SW5*b*.

In addition, at the time point T7, the switch SW6*a* is turned on according to the enable level, for example, the switching control signal SC6 of the low level. Due to the turned-on switch SW6*a,* the amplifier 2231 may serve as a unity gain buffer.

At the time point T7, the switch SW6*b* is turned on according to the enable level, for example, the switching control signal SC6 of the low level. Due to the turned-on switch SW6*b,* the amplifier 2231 may serve as a unity gain buffer.

In addition, at the time point T7, the switch SW7 is turned on according to the enable level, for example, the switching control signal SC7 of the low level. Node 8 and node 11 are connected through the turned-on switch SW7. Thus, as the negative output terminal and the positive output terminal of the amplifier 2231 are connected through the turned-on switch SW7, the output of the amplifier 2231, that is, the sensing voltage Vo, is reset.

In addition, at the time point T7, the switch SW8*a* is turned on according to the enable level, for example, the switching control signal SC8 of the low level. The switch SW9*a* is turned off according to the disable level, for example, the switching control signal SC9 of the high level. According to the turning-off of the switch SW9*a,* the first feedback capacitor Cf1 is separated from the negative output terminal of the amplifier 2231. Through the turned-on switches SW5*a* and SW8*a,* a voltage corresponding to a difference between the first driving voltage Vt and the second driving voltage Vb is stored in the first feedback capacitor Cf1.

At the time point T7, the switch SW8*b* is turned on according to the enable level, for example, the switching control signal SC8 of the low level. The switch SW9*b* is turned off according to the disable level, for example, the switching control signal SC9 of the high level. According to the turning-off of the switch SW9*b,* the second feedback capacitor Cf2 is separated from the positive output terminal of the amplifier 2231. Through the turned-on switches SW5*b* and SW8*b,* a voltage corresponding to a difference between the second driving voltages Vb at both ends is stored in the second feedback capacitor Cf2.

Referring to FIGS. 5 and 11, at the time point T8 of the amplification period, the switches SW4*a,* SW4*b,* SW9*a,* and SW9*b* are turned on. The switches SW2*a*, SW2*b,* SW3*a,* SW3*b,* SW4*a,* SW4*b,* SW5*a,* SW5*b,* SW6*a,* SW6*b,* SW7, SW8*a,* and SW8*b* are turned off.

To describe in detail, at the time point T8, the switch SW4*a* is turned on according to the enable level, for example, the fourth switching control signal SC4 of the high level. The switch SW4*b* is turned on according to the disable level, for example, the fourth switching control signal SC4 of the high level. Node N2 and node N5 are connected through the turned-on switch SW4*a.* In addition, node N3 and node N6 are connected through the turned-on switch SW4*b*. Thus, the second sampling voltage ΔV is applied between node N5 and node N6.

At the time point T8, the switch SW9*a* is turned on according to the enable level, for example, the switching control signal SC9 of the low level. Due to the turned-on switch SW9*a* and the turned-off switch SW8*a,* the first feedback capacitor Cf1 is connected to the negative output terminal of the amplifier 2231 and separated from the first driving voltage Vt. In addition, according to the turned-off switch SW5*a*, the first feedback capacitor Cf1 is connected to the first sampling capacitor Cs1 in series to form a feedback loop of the amplifier 2231. The offset voltage stored in the first offset capacitor Cos1 has the same potential as the first offset voltage Vos1 of the positive input terminal (+) of the amplifier 2231 and has an opposite polarity. Therefore, the offset voltage stored in the first offset capacitor Cos1 and the first offset voltage Vos1 of the positive input terminal (+) of the amplifier 2231 are offset. That is, the amplifier 2231 may amplify and output a signal without being affected by the first offset voltage Vos1 generated at the positive input terminal (+).

At the time point T8, the switch SW9*b* is turned on according to the enable level, for example, the switching control signal SC9 of the low level. Due to the turned-on switch SW9*b* and the turned-off switch SW8*b*, the second feedback capacitor Cf2 is connected to the positive output terminal of the amplifier 2231 and separated from the second driving voltage Vb. In addition, according to the turned-off switch SW5*a*, the second feedback capacitor Cf2 is connected to the second sampling capacitor Cs2 in series to form a feedback loop of the amplifier 2231. The offset voltage stored in the second offset capacitor Cos2 has the same potential as the offset voltage Vos2 of the negative input terminal (−) of the amplifier 2231 and has an opposite polarity. Therefore, the offset voltage stored in the second offset capacitor Cos2 and the second offset voltage Vos2 of the negative input terminal (−) of the amplifier 2231 are offset. That is, the amplifier 2231 may amplify and output a signal without being affected by the second offset voltage Vos2 generated at the negative input terminal (−).

Therefore, the amplifier 2231 may amplify the second sampling voltage ΔV to generate the sensing voltage Vo without being affected by the offset voltage.

The operation according to the turned-off switches SW2*a*, SW2*b*, SW4*a*, SW4*b*, SW5*a*, SW5*b*, SW6*a*, SW6*b*, SW7, SW8*a*, and SW8*b* is the same as the operation at the time point T2 described with reference to FIG. 7, and thus a detailed description thereof will be omitted.

The first offset voltage Vos1 and the second offset voltage Vos2 are generated due to a mismatch between differential pairs of unit transistors constituting the amplifier 2231. In order to reduce magnitudes of the first offset voltage Vos1 and the second offset voltage Vos2, an area of the unit transistor should increase.

However, when an offset voltage removal method is applied as in the present invention, the same performance can be achieved even by using a unit transistor with an area that is smaller than an area according to the related art. In this way, as the area of the unit transistor decreases, a speed can increase and a high open loop gain of the amplifier 2231 can be obtained.

In addition, a ratio Cs/Cf of the first sampling capacitor Cs1, the second sampling capacitor Cs2, the first feedback capacitor Cf1, and the second feedback capacitor Cf2 is a ratio determined at the design stage. Therefore, when the capacitances of the first sampling capacitor Cs1 and the second sampling capacitor Cs2 increase, the capacitances of the first feedback capacitor Cf1 and the second feedback capacitor Cf2 increase accordingly. An increase in the number of sampling capacitors of the data driver due to the increase in the capacitances of the capacitors may affect an increase in area of the data driver.

However, the sensing circuit 22 according to the embodiment may remove the offset voltage regardless of the capacitances of the first sampling capacitor Cs1, the second sampling capacitor Cs2, the first feedback capacitor Cf1, and the second feedback capacitor Cf2. Therefore, the sampling capacitors and the feedback capacitors, which have small capacitances, are used so that the area of the data driver can be effectively reduced.

Hereinafter, a method of driving the data driver according to the embodiment will be described with reference to FIG. 12.

In operation S10, the S/H 222 may perform sampling. At the time point T1, the switch SW1 is turned on according to the switching control signal SC1 of the enable level. Through the turned-on switch SW1, the first reference voltage Vr1 is applied to node N1, and a voltage corresponding to the first reference voltage Vr1 is charged in the first sampling capacitor Cs1.

In addition, at the time point T3, the S/H 222 applies the input voltage Vi to node N2 according to the turned-on switch SW2*a* and applies the first reference voltage Vr1 to node N3 according to the turned-on switch SW2*b*. Thus, a voltage corresponding to a voltage difference between the input voltage Vi and the first reference voltage Vr1 is charged in the first sampling capacitor Cs1.

In addition, at the time point T6, the S/H 222 applies the second reference voltage Vr2 of a fixed level to node N1 according to the turned-on switch SW3. A voltage corresponding to a voltage difference between the input voltage Vi and the second reference voltage Vr2 is charged in the first sampling capacitor Cs1. A voltage corresponding to a voltage difference between the first reference voltage Vr1 and the second reference voltage Vr2 is charged in the second sampling capacitor Cs2. Therefore, a voltage difference between node N2 and node N5 becomes the second sampling voltage ΔV.

In the embodiment, the second sampling voltage ΔV may be provided to the AMP 223 using the second reference voltage Vr2 of a fixed level, and as a result, the linearity of the sensing voltage Vo output from the AMP 223 can be secured regardless of a change in input voltage Vi.

In operation S20, at the time points T7 and T8, the AMP 223 amplifies the second sampling voltage ΔV to generate the sensing voltage Vo.

To describe in detail, at the time point T7, the second driving voltage Vb is applied to node N5 through the turned-on switch SW5*a* and to node N6 through the turned-on switch SW5*b*. In addition, due to the turned-on switches SW6*a* and SW6*b*, the amplifier 2231 may serve as a unity gain buffer.

At the time point T7, an output of amplifier 2231, that is, the sensing voltage Vo, is reset due to the turned-on switch SW7.

In addition, at the time point T7, by turning the switches SW8*a* and SW8*b* on and turning the switches SW9*a* and SW9*b* off, a voltage corresponding to a difference between the first driving voltage Vt and the second driving voltage Vb is stored in the first feedback capacitor Cf1, and a voltage corresponding to a difference between the second driving voltages Vb of both ends is stored in the second feedback capacitor Cf2.

At the time point T8, by turning the switches SW4*a* and Sw4*b* on, node N2 and node N5 are connected, and node N3 and node N6 are connected. Thus, the second sampling voltage ΔV is applied between node N5 and node N6.

At the time point T8, due to the turned-on switches SW9*a* and SW9*b* and the turned-off switches SW8*a* and SW8*b*, the offset voltage stored in the first offset capacitor Cos1 and the first offset voltage Vos1 of the positive input terminal (+) of the amplifier 2231 are offset, and the offset voltage stored in the second offset capacitor Cos2 and the second offset voltage Vos2 of the negative input terminal (−) of the amplifier 2231 are offset. Therefore, the amplifier 2231 may amplify and output the sensing voltage Vo without being affected by the first offset voltage Vos1 generated at the positive input terminal (+) and the second offset voltage Vos2 generated at the negative input terminal (−).

Therefore, according to the present invention, the sensing signal can be generated regardless of an influence of the offset voltage.

The invention claimed is:

1. A sensing circuit comprising:

an analog front end circuit configured to generate an input voltage corresponding to a pixel voltage of a sensed pixel;

a sample-and-hold circuit configured to store a first sampling voltage corresponding to a first voltage difference between the input voltage and a first reference voltage at a first time point, generate a second sampling voltage by converting the first sampling voltage using a second reference voltage at a second time point after the first time point, and output the second sampling voltage, wherein the sample-and-hold-circuit comprises a first capacitor connected between a first node and a second node to which the input voltage is transmitted and a second capacitor connected between the first node and a third node to which the first reference voltage is transmitted, wherein the second sampling voltage is a voltage difference between the second node and the third node, and wherein the sample-and-hold circuit is configured to maintain linearity of the second sampling voltage; and an amplification circuit configured to amplify the second sampling voltage to generate a sensing voltage, wherein the input voltage is higher than the first reference voltage and the second reference voltage, and the first reference voltage is lower than the second reference voltage, wherein the amplification circuit comprises an amplifier, at least one offset capacitor and at least one feedback capacitor, and is configured to form a feedback loop that includes the at least one feedback capacitor connected in series with at least one sampling capacitor of the sample-and-hold circuit, and wherein an offset voltage stored on the at least one offset capacitor before the amplification is configured to be applied with opposite polarity to an offset voltage at an input terminal of the amplifier to cancel the offset voltage during the amplification of the second sampling voltage.

2. The sensing circuit of claim 1, wherein the sample-and-hold circuit includes:

a first switch configured to transmit the first reference voltage to the first node;

a second switch configured to transmit the input voltage to the second node; and a third switch configured to transmit the first reference voltage to the third node, wherein, when the first reference voltage is applied to the first node by turning the first switch on, the first sampling voltage corresponding to the first voltage difference between the input voltage and the first reference voltage is stored by turning the second switch and the third switch on.

3. The sensing circuit of claim 2, wherein:

the sample-and-hold circuit further includes a fourth switch configured to transmit the second reference voltage of a fixed level to the first node; and in order to convert the first sampling voltage to the second sampling voltage after the first sampling voltage is stored, the sample-and-hold circuit is configured to transmit the second reference voltage to the first node by turning the fourth switch on.

4. The sensing circuit of claim 3, wherein the sample-and-hold circuit further includes:

a fifth switch connected between the second node and the amplification circuit; and a sixth switch connected between the third node and the amplification circuit, wherein the fifth and sixth switches are configured to switch the second sampling voltage to be output to the amplification circuit.

5. The sensing circuit of claim 3, wherein, when the first switch, the second switch, and the third switch are turned off and the fourth switch is turned on, the sample-and-hold circuit is configured to convert the first sampling voltage into the second sampling voltage by the second reference voltage transmitted to the first node.

6. The sensing circuit of claim 3, wherein the first sampling voltage corresponds to a voltage difference between the first node and the second node.

7. A data driver comprising:

an analog front end circuit configured to generate an input voltage corresponding to a pixel voltage of a sensed pixel;

a sample-and-hold circuit configured to store a first sampling voltage corresponding to the input voltage using a first reference voltage at a first time point and output a second sampling voltage obtained by converting the first sampling voltage using a second reference voltage at a second time point after the first time point, wherein the sample-and-hold circuit is configured to store the first sampling voltage corresponding to a first voltage difference between the input voltage and the first reference voltage, generate the second sampling voltage by converting the first sampling voltage using the second reference voltage, and output the second sampling voltage, wherein the sample-and-hold-circuit comprises a first capacitor connected between a first node and a second node to which the input voltage is transmitted and a second capacitor connected between the first node and a third node to which the first reference voltage is transmitted, wherein the second sampling voltage is a voltage difference between the second node and the third node, and wherein the sample-and-hold circuit is configured to maintain linearity of the second sampling voltage;

an amplification circuit configured to amplify the second sampling voltage to generate a sensing voltage; and an analog-to-digital converter configured to output a digital signal corresponding to the sensing voltage, wherein the amplification circuit comprises an amplifier, at least one offset capacitor and at least one feedback capacitor, and is configured to form a feedback loop that includes the at least one feedback capacitor connected in series with at least one sampling capacitor of the sample-and-hold circuit, and wherein an offset voltage stored on the at least one offset capacitor before the amplification is configured to be applied with opposite polarity to an offset voltage at an input terminal of the amplifier to cancel the offset voltage during the amplification of the second sampling voltage.

8. The data driver of claim 7, further comprising a bias voltage supply circuit configured to provide the first reference voltage and the second reference voltage of a fixed level.

9. The data driver of claim 7, wherein the input voltage is higher than the first reference voltage and the second reference voltage, and the first reference voltage is lower than the second reference voltage.

10. The data driver of claim 7, wherein the sample-and-hold circuit further includes:

a first switch configured to transmit the first reference voltage to the first node;

a second switch configured to transmit the input voltage to the second node; and a third switch configured to transmit the first reference voltage to the third node, wherein, when the first reference voltage is applied to the first node by turning the first switch on, the first sampling voltage corresponding to the first voltage difference between the input voltage and the first reference voltage is stored by turning the second switch and the third switch on.

11. The data driver of claim 10, wherein:

the sample-and-hold circuit further includes a fourth switch configured to transmit the second reference voltage to the first node; and in order to convert the first sampling voltage to the second sampling voltage after the first sampling voltage is stored, the sample-and-hold circuit is configured to transmit the second reference voltage to the first node by turning the fourth switch on.

12. The data driver of claim 11, wherein the sample-and-hold circuit further includes:

a fifth switch connected between the second node and the amplification circuit; and a sixth switch connected between the third node and the amplification circuit, wherein the fifth and sixth switches are configured to switch the second sampling voltage to be output to the amplification circuit.

13. The data driver of claim 11, wherein, when the first switch, the second switch, and the third switch are turned off and the fourth switch is turned on, the sample-and-hold circuit is configured to convert the first sampling voltage into the second sampling voltage by the second reference voltage transmitted to the first node.

14. The data driver of claim 10, wherein the first sampling voltage corresponds to a voltage difference between the first node and the second node.

15. The data driver of claim 10, wherein the second sampling voltage corresponds to a voltage difference between the second node and the third node.

* * * * *